United States Patent Office 3,479,178
Patented Nov. 18, 1969

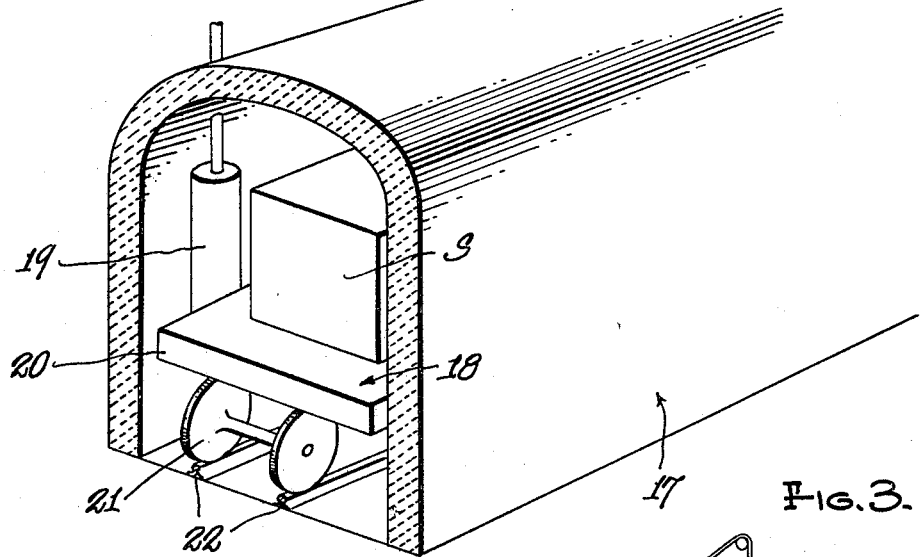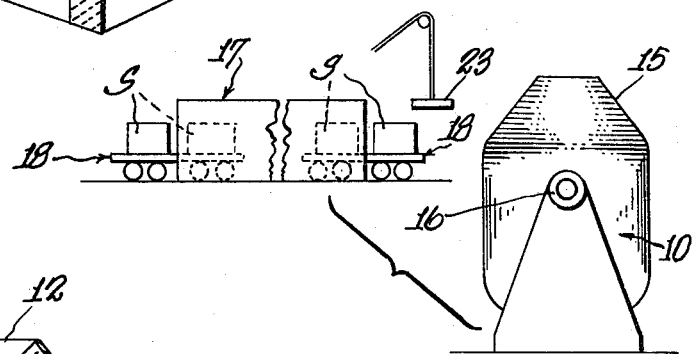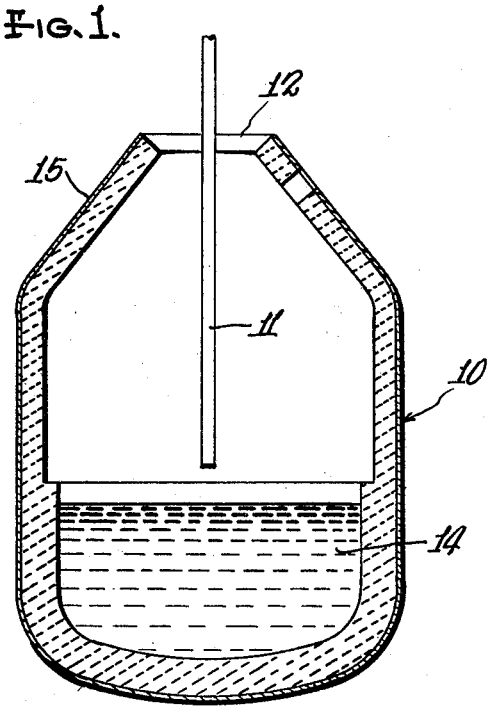

3,479,178
METHOD OF PREHEATING AND CHARGING SCRAP TO A BOF
James J. Bowden, P.O. Box 127, Cortland, Ohio 44410
Filed May 24, 1966, Ser. No. 552,593
Int. Cl. C21c 5/28
U.S. Cl. 75—60                    1 Claim

ABSTRACT OF THE DISCLOSURE

Preheating scrap before it is charged into a basic oxygen vessel by placing the scrap on cars which are driven through a tunnel-type furnace. A non-oxydizing atmosphere is maintained in the furnace and radiant heat is utilized to minimize the addition of objectionable oxides to the scrap. The scrap is heated to a temperautre just short of the point where it loses its magnetism, and a magnet is used to lift the scrap from the cars and deliver it to the vessel.

---

My invention relates to the making of steel, and the principal object of my invention is to provide new and improved methods of and means for making steel.

My invention is adapted for use with the oxygen-blown basic steel making process which utilizes a basic oxygen furnace (BOF), and the following description will be directed to such combination.

It is an important object of my invention to effect economies in the BOF process and such economies include a shorter time period of use of the basic oxygen furnace which accordingly increases the life of the furnace and reduces maintenance expense by reducing the frequency of relining the furnace. Further, a shorter operating time makes it possible to increase production. My invention also makes it possible to use a greater amount of less expensive scrap and a lesser amount of more expensive pig iron, and also reduces oxidation losses in the furnace.

In the drawing accompanying this specification and forming a part of this application, there is shown, for purposes of illustration, an embodiment which my invention may assume, and in the drawing:

FIGURE 1 is a vertical sectional view through a basic oxygen furnace,

FIGURE 2 is a perspective view through a preheating furnace, an end being shown in section, and FIGURE 3 is a small scale representation of the BOF furnace combined with the preheating furnace.

In FIGURE 1, a top blown vessel 10 is disclosed, this description of the furnace being customary because oxygen is supplied by a water-cooled lance 11 suspended vertically so that it can be raised and lowered through the mouth 12 of the vessel within the desired distance from the metal bath 14.

The vessel is refractory-lined and ladle-shaped with either an eccentric or concentric nose 15, the latter type nose being illustrated in FIGURE 1. The lining usually consists of a single course of magnesite brick covered with a rammed layer of tar and magnesite. Large bricks made from tar and dolomite have also been used. Heretofore, the lining had to be almost completely replaced after about 400 heats. The refractory consumption has been reported as about 20 to 30 pounds per ton of steel ingots. The vessel 10 is supported on a conventional trunnion 16 which permits tilting of the vessel for charging and pouring.

A normal practice heretofore, particularly where pig iron was in abundant supply, was to charge the basic vessel with about 30% scrap and about 70% melted pig iron, and other required ingredients such as lime, limestone and the like. The relatively cold scrap would cool the pig iron to an average temperature and therefore when the lance was lowered into the vessel and the oxygen ignited, the heat needed to melt the scrap had to come from the heat of combustion of the silicon, carbon and manganese in the pig iron, and possibly from the combustion of some iron from the pig iron. Thus, considerable time and oxygen were required to bring up the heat to desired temperature. Also, some of the pig iron was used up in this process.

In some localities where pig iron was not plentiful, only scrap was charged into the basic vessel and heated by combustion of a fuel, such as oil or natural gas, and the scrap was preheated to a temperature of about 1000° F. to 1500° F. Thereafter the melted pig iron and other ingredients were charged into the furnace and the lance lowered and the oxygen turned on to ignite. This conserved pig iron and enabled the use of a higher percentage of scrap and a lower percentage of pig iron, and therefore effected an economy in operation since the pig iron normally sells for about $10 to $15 per ton more than scrap.

However, this latter process introduced many disadvantages which in large part offset the economy in the price differential between pig iron and scrap. First of all, it required use of the basic vessel to preheat the scrap and therefore the vessel was not available at that time for making steel. Further, during preheating of the scrap, the refractory lining of the vessel was subjected to deterioration and therefore needed to be repaired and/or relined more frequently. And of equal importance, undesirable oxides are formed in this preheating process, and these oxides had to be removed during the steel making process or otherwise they would affect the time element of the heat, or affect the quality of the steel, or require the addition of further ingredients to insure their removal.

My invention largely eliminates the disadvantages above noted, while retaining the economies in higher scrap and lower pig iron percentages and in increased production. In accordance with my invention the scrap is preheated outside of the basic vessel and charged into the latter only after it has reached a predetermined temperature.

I prefer to preheat the scrap in a furnace 17 which is preferably positioned adjacent to the vessel 10, as suggested in FIGURE 3. The preheat furnace I now propose is a car or tunnel-type furnace, shown in FIGURES 2 and 3, wherein a car 18 (or cars) passes through the furnace, the scrap S being carried on the car.

Radiant heating devices 19 are preferably positioned at spaced intervals along both inner sides of the furnace 17, such devices being preferred to reduce oxidation of the scrap during the preheating and thus reduce the need to remove deleterious iron oxides from the charge in the vessel 10 at a later time. Also, a non-oxidizing atmosphere may be maintained within the furnace 17 to further insure against oxidation of the scrap.

It will be understood that the cars 18 are of a design so that the platform 20 and undercarriage 21 are substantially unaffected by the heat in the furnace. The cars may be moved along rails 22 which also are protected from the heat. In order to make the preheating operation substantially continuous, the rails may be formed in a closed loop with a section outside the furnace 17 and parallel to the section inside the furnace, the ends of the inside and outside sections being joined by curved rails sections, so that a car 18 may be loaded with scrap S outside of the furnace, may then enter the furnace to preheat the scrap, may leave the furnace and the preheated scrap removed and charged into the vessel 10, and the car returned to its starting point for receiving another load of scrap.

I presently prefer to preheat the scrap S to about 1290° F. which is just short of where the scrap would lose its magnetic properties, so that a crane-supported magnet 23 may be used to lift the preheated scrap from the car and charge it into the vessel 10. The preheating of the scrap is preferably timed with the charging frequency of the vessel 10 so that the process is continuous to obtain the optimum in efficiency from the combined apparatus. Accordingly, the heat in the furnace, the rate of travel of the cars 18, and the length of the furnace are correlated to the charging frequency time of the vessel 10.

After the preheated scrap is charged into the vessel, the pig iron and other ingredients are then charged into the vessel and the oxygen heating of the entire batch is begun. Since the scrap is already preheated, it is no longer necessary to carry out this preheating in the vessel, and thus is effected not only a saving of time in the heat, but also a saving of wear and tear on the vessel.

Since the scrap is preheated, more of it can be charged into the vessel and less pig iron is required, and this effects a savings in cost of production of steel. It has been estimated that in a 140 ton heat in the vessel 10, the scrap charge (through the use of my invention) may be increased as much as 24,000 pounds (12 tons) with a ten minute preheat.

In view of the foregoing, it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:
1. In the process of making steel wherein ferromagnetic steel scrap is preheated to an elevated temperature within an enclosure prior to charging the steel scrap into a basic oxygen furnace thereadjacent, the improvement comprising the steps of:
 effecting said preheating by radiantly heating said steel scrap in a non-oxidizing atmosphere thereby to prevent the formation of oxides on said scrap throughout said preheating,
 terminating said preheating when said steel scrap reaches a maximum temperature on the order of 1300° F., and beneath the temperature at which said scrap loses its ferromagnetic properties, thereby also to minimize the formation of oxides during subsequent transferring of said scrap to the furnace, and
 magnetically lifting and transferring said temperature-controlled preheated scrap from the preheating enclosure to the furnace, and charging the scrap thereinto.

References Cited

UNITED STATES PATENTS

| | | | |
|---|---|---|---|
| 2,818,247 | 12/1957 | Francis | 75—60 |
| 2,836,309 | 5/1958 | McFeaters | 75—44 X |
| 3,219,439 | 11/1965 | Longenecker | 75—60 |
| 3,223,521 | 12/1965 | Stone | 75—60 |
| 3,301,662 | 1/1967 | Ban | 75—60 |
| 3,307,935 | 3/1967 | Lindholm | 75—60 |

OTHER REFERENCES

Metals Handbook, 1948 edition, published by the A.S.M., pp. 424–425.

L. DEWAYNE RUTLEDGE, Primary Examiner

G. K. WHITE, Assistant Examiner

U.S. Cl. X.R.

266—34